Aug. 18, 1959   R. JÖRN   2,900,001
ELASTIC WHEELS FOR VEHICLES
Filed Dec. 27, 1954   2 Sheets-Sheet 1

INVENTOR.
Raoul Jörn
BY Richards & Geier
ATTORNEYS

Aug. 18, 1959   R. JÖRN   2,900,001
ELASTIC WHEELS FOR VEHICLES
Filed Dec. 27, 1954   2 Sheets-Sheet 2
*Fig. 7*
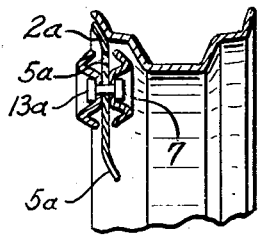
*Fig. 8*
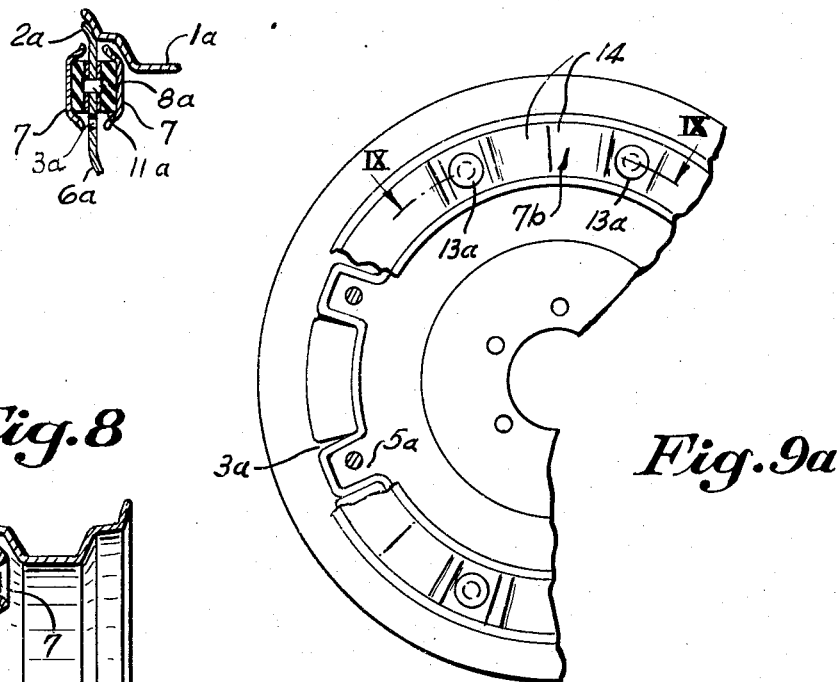
*Fig. 9a*
*Fig. 9*
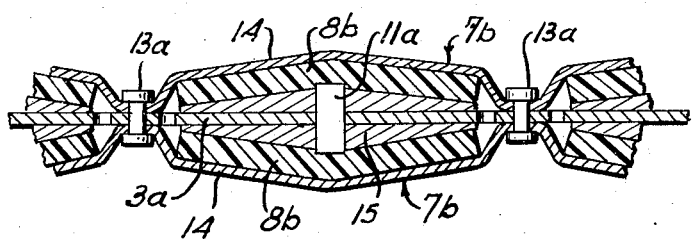
INVENTOR.
Raoul Jörn
BY Richards & Geier
ATTORNEYS United States Patent Office 2,900,001
Patented Aug. 18, 1959

2,900,001

ELASTIC WHEELS FOR VEHICLES

Raoul Jörn, Hamburg-Harburg, Germany, assignor to Metallgummi G.m.b.H., Hamburg-Harburg, Germany, a German limited liability company Application December 27, 1954, Serial No. 477,624

2 Claims. (Cl. 152—49)

This invention relates to an elastic wheel for vehicles.

An object of the present invention is the provision of an elastic wheel for vehicles, such as street cars and other vehicles traveling upon rails, which will be driven with compartively little noise and wherein the path of the spring movement is comparatively small.

Another object is the provision of an elastic wheel which is comparatively light in weight, so that it can be used in compartively light vehicles which do not travel upon rails.

A further object is the provision of an elastic wheel which operates most effectively despite comparatively small cross-sectional areas of rubber.

Still another object is the provision of an elastic wheel which in use will be driven without any substantial amount of noise such as is usually developed when wheels travel over stones or the like.

Yet another object is the provision of an elastic wheel which has a better contact adhesion to the supporting surfaces so that it will easily travel on curves and wherein the elasticity of a wheel furthers the resilient spring suspension of the vehicle.

Thus, one of the important objects of the present invention is to provide an elastic wheel which is suitable for comparatively light vehicles traveling on rails as well as for vehicles which travel without rails, said wheels being economical in construction and being of light weight.

Other objects of the present invention will become apparent in the course of the following specification:

In accomplishing the objects of the present invention it was found desirable to provide a wheel having a plurality of rubber bodies distributed circumferentially upon the wheel and being so arranged that they are subjected substantially to shearing forces. These rubber bodies are firmly connected with metal parts and have a round or an elongated annular cross-section. In accordance with the present invention, the rubber bodies are located opposite each other and are attached to metal rings located on opposite sides of the wheel disc. The rubber bodies or members may be connected with the wheel rim or with the wheel disc.

An additional advantage of this construction is that the elastic wheel is composed of a few parts and due to the provision of the rings engaging on opposite sides, the wheel disc is considerably stronger despite its light weight than constructions known in prior art.

In accordance with another feature of the inventive idea, the wheel rim and the wheel disc are provided with interengaging tooth-like projections and recesses extending in the vertical plane of the wheel disc.

This construction has the advantage of providing the desired number of rubber members and of distributing them uniformly circumferentially upon the wheel. Furthermore, due to the provision of the recesses a path for the resilient movement is provided which is most useful for certain types of constructions.

According to a modification of the inventive idea, large paths of spring movement are provided by connecting the rubber members alternately with the wheel disc and the wheel rim. Thus, in each pair of rubber members, the two rubber members are interconnected in series, so that the elastic paths produced by each of the rubber members are added to one another. This is the construction which, by way of example, is desirable in many instances for automotive vehicles.

According to a further embodiment of the inventive idea, the metal ring is directly connected with the wheel disc or the wheel rim, so that during spring deflection only the resilient path of one of the two rubber members which work in parallel, becomes effective. This may be desirable for heavier vehicles or for vehicles traveling upon rails.

Another feature of the last mentioned modification of the invention consists in that the metal rings carrying the rubber members are interconnected by bolts extending through the recesses which are located between the teeth. These bolts extend transversely through the recesses and are used solely for the purpose of interconnecting the two metal rings and tensioning them, so that the rubber receives the preliminary pressure tension which is required for its resistance against shearing. Furthermore, this provides a firm connection between pins carried by the wheel disc or the wheel rim and corresponding recesses provided in the rubber members or metal plates carried therewith by vulcanization. When the wheels are of small size, these bolts do not interfere with the required compact construction of the wheel and provide large paths for elastic movements of the parts which move relatively to each other.

Furthermore, to increase the bending resistance of the metal rings in accordance with the present invention, they are provided with trough-like cross-sections. The sides of the rings extend at such angles that when the rubber members are subjected to excessive shearing forces, they will be pressed against the side walls and thus are safe from destruction.

Finally, in accordance with the present invention, the surfaces of the two metal rings which extend parallel to the vertical plane of the wheel, as well as the metal plates located within the rings, and joined to the rubber members by vulcanization, have both a curvature in the tangential and radial sections extending toward the middle of the rubber surface. Due to this arrangement, when the wheel is subjected to a perpendicular force as well as to a torque, the rubber in addition to a pure shearing force will be subjected to an additional pressure component. Thus, the resiliency diagram will then be progressively formed, and this is particularly advantageous for rubber-containing elastic wheels.

The invention will appear more clearly from the following detailed description when taken in connection with the accompanying drawings, showing by way of example preferred embodiments of the inventive idea.

In the drawings:

Figure 7 is a section along the line VII—VII of Figure 6;

Figure 8 is a section along the line VIII—VIII of Figure 6;

Figure 9 is a partial circumferential sectional view of a somewhat differently constructed elastic wheel;

Figure 9a is a side view of the construction shown in Figure 9, a part of the annular ring being broken off.

Figure 1:
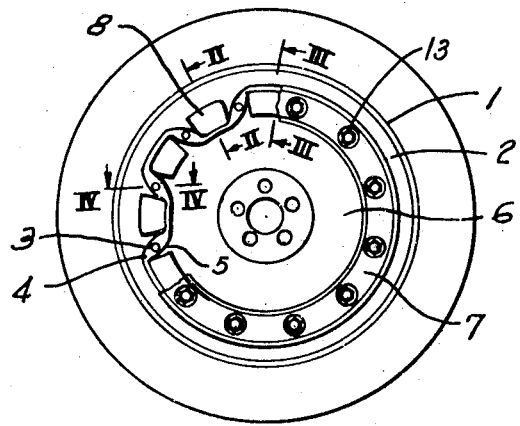
Figure 1 is a side view with a portion of the annular ring broken away of an elastic wheel constructed in accordance with the principles of the present invention.

The elastic wheel shown in Figures 1 to 5, inclusive, includes a wheel rim 1 and a wheel disc 6. A flange 2 is rigidly connected to the inner circumference of the wheel rim 1 and is provided with circumferentially disposed inwardly extending tooth-like projections 3 which are separated by recesses 4 between the projections. Tooth-like outwardly directed projections 5 are connected with or form a part of the wheel disc 6 and are located wtihin the recesses 4 and between the projections 3.

Figure 3:
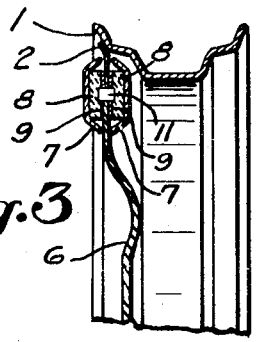
Figure 3 is a partial section along the line III—III of Figure 1.
Figure 4:
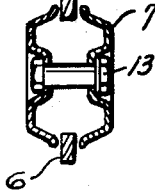
Figure 4 is a partial section along the line IV—IV of Figure 1.
Figure 5:
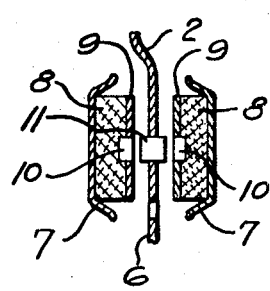
Figure 5 is a diagrammatic sectional view similar to Figure 2 but illustrating the parts as being separated one from the other.

Two opposing rings 7 are situated adjacent the inner intermeshing portions of the flange 2 and the wheel disc 6 on each side thereof. As shown in Figures 2 to 5, the rings 7 are trough-like in cross-section and their flanges are directed toward each other. The rings 7 carry rubber bodies 8. As is indicated in Figure 1, several rubber bodies 8 are located within one ring 7 and each of the rubber bodies is somewhat smaller than a projection 3 or 5 and is located within the outline of the projection. The rubber bodies 8 are firmly connected to the bottom surface of the ring 7 by any suitable means known in the art. Metal discs 9, best shown in Figure 5, are located upon the opposed surfaces of the rubber bodies 8 and are firmly connected with these surfaces.

Figure 2:
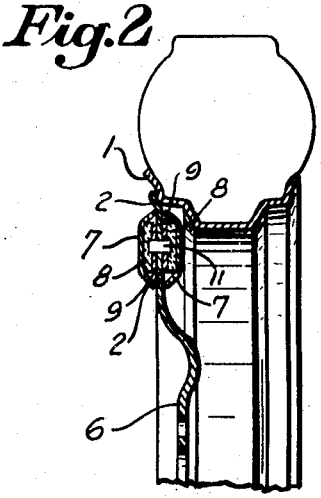
Figure 2 is a partial enlarged section along the line II—II of Figure 1.

Each of the rubber bodies 8 and the plates 9 connected therewith are provided with a recess 10 located substantially centrally in the body 8. As indicated in Figures 2 and 3, the recesses 10 which are located in opposed rubber bodies 8 are situated opposite each other. The recesses 10 receive pins 11 which are carried by the tooth-like projections 3 and 5 of the flange 2 and the disc 6, respectively.

As illustrated in Figures 2 and 3, the pins 11 fit snugly within the recesses of the rubber bodies. The opposed rings 7 are interconnected by bolts 13 extending between the rings and having head portions and screws fitting into depressed portions provided in the ring 7, as indicated in Figure 4. It is apparent that by tightening the bolts 13, the rubber bodies 8 and the plates 9 carried thereby will be firmly connected with the pins 11. Furthermore, by tensioning the bolts 13, the preliminary tension of the rubber bodies 8 may be varied.

Since the pins 11 are mounted alternately upon the teeth 3, belonging to the wheel rim 1, and upon the teeth or tooth-like projections 5 belonging to the wheel disc 6, the elastic paths of the rubber bodies 8 will be interconnected in series.

Figure 6:
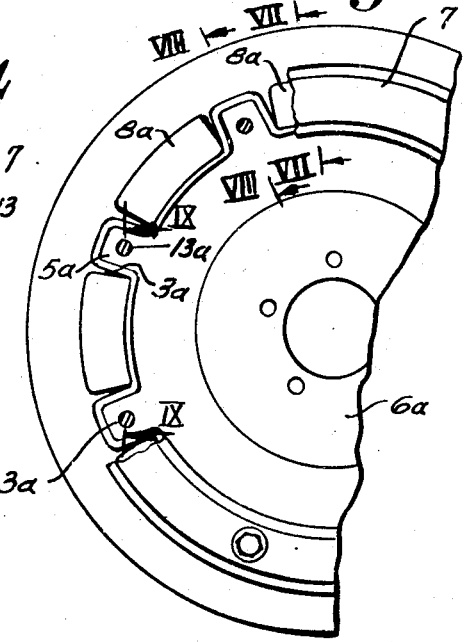
Figure 6 is a partial side view having a portion of the annular ring broken away of another embodiment of the invention.

Figures 6 to 8 illustrate a somewhat different construction, wherein, however, the shape of the rings 7 remains substantially the same. However, in this construction, the wheel rim 1a has comparatively wide teeth 3a, carrying pins 11a which engage into corresponding recesses provided in the rubber bodies 8a. The rubber bodies 8a have substantially the length of the teeth 3a and are firmly atttached to the bottom surfaces of the rings 7. The wheel disc 6a has comparatively small projections 5a which are located between tooth-like projections 3a. The projections 5a carry solely bolts 13a which are used to join the opposed rings 7, as indicated in Figure 8. Thus, in the construction shown in Figures 6 to 8, there is no elastic connection at all between the wheel disc 6a and the rings 7. An elastic connection is present only between the rings 7 and the wheel rim 1a, so that as far as this construction is concerned only the elastic paths of the rubber bodies 8a are of importance.

Figure 9 is a circumferential section through opposed rings 7b provided with inclined and curving surfaces, Figure 9a being a section side view. The rubber bodies 8b are subjected to pressure and shearing forces in the case of a load, so that the spring action is a progressive one. As shown in Figure 9, the rings 7b have inclined portions 14 which include surfaces at which the rubber bodies 8b are joined to the rings. The metal plates, firmly connected to the opposed surfaces of the rubber bodies 8b, have the form of wedges 15. Due to this arrangement, the rubber will be pressed obliquely against the plates 15 in the direction of the load. Other parts of this construction are the same as those shown in Figs. 6 to 8 and are designated by the same numerals.

It is apparent that the examples shown above have been given solely by way of illustration and not by way of limitation and that they are subject to many variations and modifications without exceeding the scope of the present invention. All such variations and modifications are to be included within the scope of the present invention.

What is claimed is:

1. In an elastic wheel having a wheel rim body and a wheel disc body separated therefrom, said bodies having intermeshing projections and recesses located substantially within the plane of the wheel disc body, two rings located on opposite sides of the wheel disc body, said rings having sections located opposite the projections of the wheel rim body, each section having opposed inclined portions extending from the center of the section toward the edges of the last-mentioned projections, a separate substantially rectangular rubber member attached to an inner surface of each section, said rubber members forming two groups having inner surfaces located opposite each other, metal wedges attached to the last-mentioned inner surfaces and having inner surfaces engaging the last-mentioned projections, said wedges and said rubber members having opposed recesses, pins carried by the last-mentioned projections and fitting into the last-mentioned recesses, said rings having portions located between said sections and recessed relatively to said sections, and a plurality of bolts located in the recessed portions of said rings and extending transversely to the plane of the wheel disc, said bolts interconnecting said rings.

2. An elastic wheel comprising, an outer wheel rim body, an inner wheel disc body separated therefrom, a separate ring located on each side of said bodies and spanning the separation therebetween, said rings having inclined sides, a plurality of rubber members joined to the sides of the rings, a separate metal member having a recess therein and attached to each of said rubber members, said bodies having intermeshing projections and recesses located substantially within the plane of the wheel disc body, pin-like protuberances on said projections engaging respective recesses of said metal members, and bolts carried by said rings to hold said rubber members with said metal members in tight engaging contact with said rim body and said disc body.

References Cited in the file of this patent

UNITED STATES PATENTS

| Re. 23,161 | MacLean | Oct. 25, 1949 |
| 2,124,350 | Hirshfeld | July 19, 1938 |
| 2,672,906 | MacLean | Mar. 23, 1954 |
| 2,672,907 | MacLean | Mar. 23, 1954 |

FOREIGN PATENTS

| 651,007 | Great Britain | Mar. 7, 1951 |